W. M. THAYER.
STORAGE BATTERY GRID.
APPLICATION FILED APR. 17, 1908.
918,221.
Patented Apr. 13, 1909.
2 SHEETS—SHEET 2.
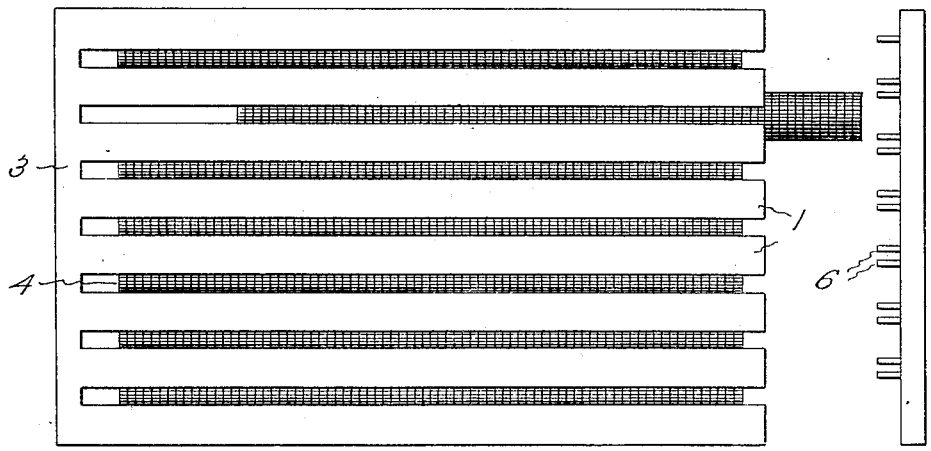
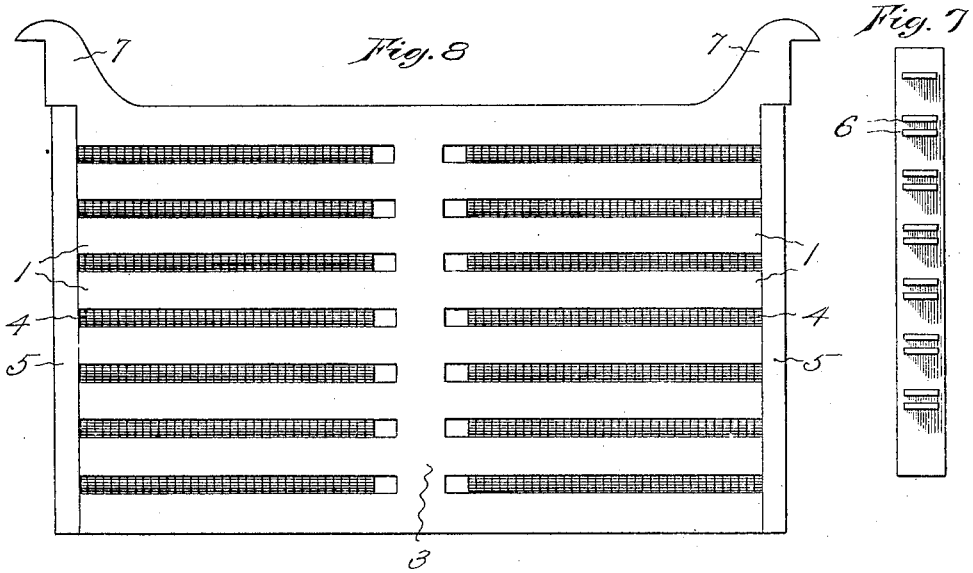

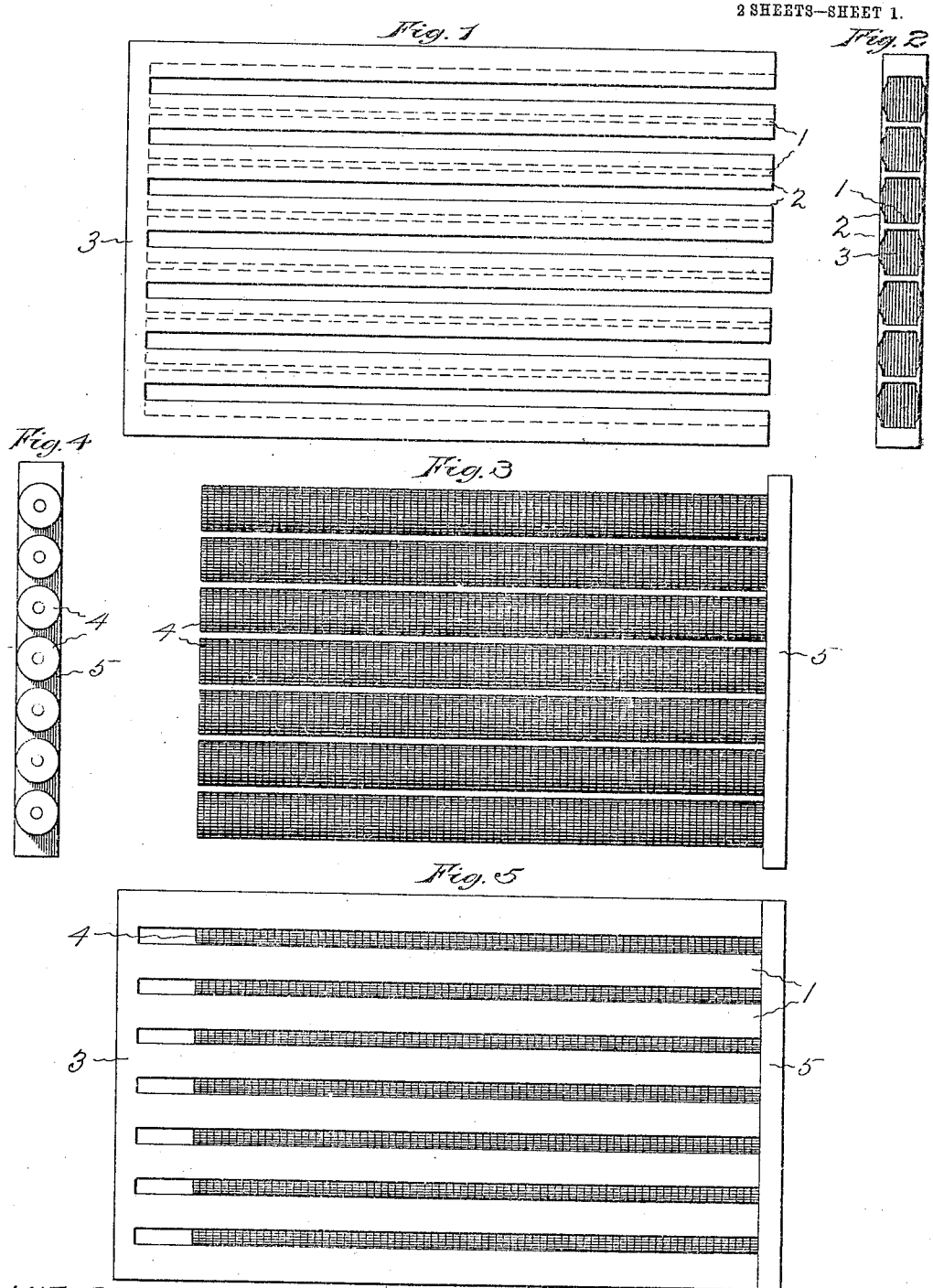

UNITED STATES PATENT OFFICE.

WILLIS M. THAYER, OF HARTFORD, CONNECTICUT.

STORAGE-BATTERY GRID.

No. 918,221.  Specification of Letters Patent.  Patented April 13, 1909.

Application filed April 17, 1908. Serial No. 427,635.

To all whom it may concern:

Be it known that I, WILLIS M. THAYER, a citizen of the United States, residing at Hartford, in the county of Hartford and State of Connecticut, have invented a new and useful Storage-Battery Grid, of which the following is a specification.

This invention relates to a grid which is more particularly adapted to be used for a positive element in a stationary storage battery designed for heavy work, but it is equally applicable for use in a portable battery or in a battery designed for light work, and it also can be used for a negative element in a storage battery.

The object of the invention is to produce a storage battery element which is simple to make, easy to put together, and which has great mechanical strength for its weight, can be readily handled without injury, and is durable and very efficient in action.

The illustrated embodiment of the invention has a grid member formed of a plural number of bars with flanged edges that extend parallel with each other in such relation as to form longitudinal pockets between them, and an active member formed of a plural number of rods that extend parallel with each other in such manner that they may be inserted axially into and be supported by the walls of the pockets between the bars of the grid member.

Figure 1 of the accompanying drawings shows a side elevation of a grid member that embodies this invention. Fig. 2 shows an end view of the grid member. Fig. 3 shows a side elevation of one form of active member that may be used with this invention. Fig. 4 shows an end view of this active member. Fig. 5 shows a side elevation of the grid and active members assembled into a complete battery element as in use. Fig. 6 illustrates a different way of assembling the members. Fig. 7 shows an edge view of the connecting post illustrated in Fig. 6. Fig. 8 shows a modified form of the grid.

The grid member may be formed of any desired number of bars 1 which are recessed upon their upper and lower sides or provided with flanges 2 on their edges to form channels. These bars are arranged adjacent to and parallel with each other so as to form open pockets that extend longitudinally between them, and they may be cast integral with or otherwise suitably fastened to a post 3 which may join the ends of the bars, as shown in Fig. 1, or may be at the middle of the element as shown in Fig. 8. This member is usually cast to shape of antimonious lead, but it may be made in a different manner and of other metal having the requisite characteristics.

The active member illustrated is formed of a plural number of rods 4. These rods may be corrugated, threaded, slitted, or otherwise formed to increase the exposed surface, and they may be cast in, lead-burned to, or otherwise joined with a post 5 which preferably connects them at one end. These rods which are represented as circular in cross section, but which may have any other suitable cross-sectional shape, are somewhat shorter than the length of the pockets to permit growth and are preferably made from soft lead formed into spongy or per-oxid of lead before they are arranged in the grid, but they may be made of other common active material, and the post joining the rods may be made of antimonious lead.

In assembling the parts of the element described, the rods of the active member are thrust into the pockets between the bars of the grid member and the post supporting the rods lead-burned or otherwise fastened to the ends of the bars in such manner that the rods are supported by the bars. This forms a simple method of assembling the parts and produces a strong grid with the active rods supported by and in contact with the grid bars and having sufficient space about them for the circulation of the electrolyte, which may be ordinary dilute sulfuric acid.

Any desired number of flanged or recessed bars may be employed in making up the grid member, and these bars may be of any size and may have longitudinally extending pockets of any size and cross sectional shape. The rods of the active member would ordinarily be equal in number to the pockets of the grid, and in case that the joining post of the grid bars were at one end, the active rods would be inserted at one end, but if the joining post of the grid were at the center, the active rods would be inserted at both ends of the grid, as shown in Fig 8.

If it is desired, the post for joining the open ends of the grid bars can be provided with lugs 6, as shown in Fig. 6 and after the active rods have been inserted into the pockets this post is connected with the ends of the bars in any suitable way. These lugs are preferably arranged so that they extend above and below and support the ends of the bars when the rods are in the pockets and the post is fastened to the bars. These grids can be provided with the usual supporting lugs 7, as shown in Fig. 8, and any desired number of elements mounted in a battery cell in the ordinary manner.

A grid constructed in this manner has great mechanical strength for its weight, and the active material is supported and protected in such a way that the element can be readily handled without injury. The amount of lead burning to properly connect the parts is very small. Electrically, the grid member holds the active material in place allowing for growth, without any tendency to buckle and the advantages of a formed and a pasted plate are united, because as the active material becomes dislodged from its original support it is still held in place in the pockets so that it can be worked to its full capacity. The active material is always in metallic engagement with the supporting grid, and this active material can be introduced into this form of grid in a number of different forms without departing from the invention.

The invention claimed is:

1. A storage battery element comprising a plural number of bars having flanged edges, arranged parallel with each other so as to form open pockets that extend longitudinally between them, a post integral with and joining said bars at one end, a plural number of active rods located within said pockets, and a post joining said rods at one end, substantially as specified.

2. The combination of a plural number of supporting bars arranged parallel with each other so as to form longitudinally extending pockets between them, a post connecting said supporting bars, a plural number of active rods located within said pockets and a post connecting the said rods, substantially as specified.

3. The combination of a plural number of flanged supporting bars arranged longitudinally with relation to each other so as to form longitudinally extending pockets between them, a plural number of active rods located within said pockets and supported by said bars, and posts connecting the said bars at their ends, substantially as specified.

WILLIS M. THAYER.

Witnesses:
HARRY R. WILLIAMS,
JOSEPHINE M. STREMPFER.